United States Patent [19]

Inukai et al.

[11] Patent Number: 4,666,784

[45] Date of Patent: May 19, 1987

[54] MAGNETIC RECORDING MEDIUM

[75] Inventors: Chyuji Inukai, Shiga; Eizi Chino, Ootsu; Yoshio Tojima, Shiga; Hideki Komagata; Masanori Nakamura, both of Ootsu, all of Japan

[73] Assignee: Toyo Boseki Kabushiki Kaisha, Osaka, Japan

[21] Appl. No.: 887,460

[22] Filed: Jul. 21, 1986

[30] Foreign Application Priority Data

Jul. 26, 1985 [JP] Japan ................... 60-166213
Jul. 26, 1985 [JP] Japan ................... 60-166214

[51] Int. Cl.$^4$ ................... G11B 5/702; G11B 5/71
[52] U.S. Cl. ................... 428/425.9; 252/62.5 Y; 427/128; 428/323; 428/408; 428/694; 428/900; 428/532
[58] Field of Search ............... 428/694, 407, 695, 900, 428/425.9, 323, 328, 329, 408, 532; 427/631, 128; 252/65.5 Y; 360/134-136

[56] References Cited

U.S. PATENT DOCUMENTS

| 4,152,485 | 5/1979 | Mizumura | 428/425.9 |
|---|---|---|---|
| 4,411,957 | 10/1983 | Tokuda | 428/425.9 |
| 4,420,531 | 12/1983 | Tokuda | 428/328 |
| 4,503,198 | 3/1985 | Miyai | 428/694 |
| 4,521,486 | 6/1985 | Ninomiya | 428/407 |
| 4,571,364 | 2/1986 | Kasuga | 428/423.9 |

FOREIGN PATENT DOCUMENTS

| 3137293 | 6/1982 | Japan | 252/62.5 Y |
|---|---|---|---|
| 0165464 | 10/1982 | Japan | 252/62.5 Y |
| 0012131 | 1/1983 | Japan | 252/62.5 Y |
| 2108973 | 5/1983 | United Kingdom | 252/62.5 Y |

*Primary Examiner*—Ellis P. Robinson
*Attorney, Agent, or Firm*—Barnes & Thornburg

[57] ABSTRACT

A magnetic recording medium having a magnetic layer of superior smoothness and excellent abrasion resistance and durability. The magnetic layer contains a polyurethane resin having a metal sulfonate group in the amount of 10–1000 equivalents/$10^6$g of the polymer; an ester of $C_{10}$–$C_{18}$ fatty acid with butyl cellosolve and ferromagnetic fine particles.

7 Claims, No Drawings

MAGNETIC RECORDING MEDIUM

The present invention relates to a magnetic recording medium in which the surface of the coating film (magnetic layer) is superior in smoothness, particularly the value of the friction coefficient is low and its change is very little over a wide range of temperatures and humidities, and besides the abrasion resistance and durability are excellent. Particularly, the present invention relates to a flexible and disc-like magnetic recording medium.

Hitherto, for forming tough and well slippery coating films with an object of improving the abrasion resistance and durability of magnetic recording media, many combinations of thermosetting binders and various lubricants have been proposed. For example, it is well known to use polyurethane resins, epoxy resins, polyester resins, nitrocellulose, vinyl chloride/vinyl acetate copolymers, etc. as a binder, and to crosslink these binders with polyfunctional isocyanates, etc. As to lubricants for reducing the friction coefficient of the coating film surface, there are such proposals that solid lubricants (e.g. graphite, molybdenum disulfide) or liquid ones (e.g. silicone oils, fluorine-containing oils, higher fatty acids or their esters) are mixed or dispersed in paints at the preparation step, or, if necessary, externally applied by impregnation, spraying, coating, etc. after the magnetic layer has been formed.

In the above prior arts, however, it is difficult to obtain such magnetic recording media as intended by the present invention, i.e. those in which the surface of the magnetic layer is smooth and has satisfactory abrasion resistance and durability over a wide range of temperatures. For example, when polyurethane resins or polyester resins are used as a binder, dispersion of magnetic powders such as ferromagnetic fine particles, etc. becomes difficult, so that dispersing agents such as surface active agents, etc. are required. When nitrocellulose or vinyl chloride/vinyl acetate copolymers are used as a binder, the coating film formed lacks flexibility, so that plasticizers are required.

Addition of these surface active agents or plasticizers causes a problem such that adhesion force between the magnetic layer (coating film) and non-magnetic substrate is lowered, as a result of which the coating film peels off the substrate when tapes or discs are driven or rotated for a long time. Addition of lubricants also lowers the adhesion force between the magnetic layer and non-magnetic substrate in relation to compatibility between the lubricant and binder like the addition of surface active agents or plasticizers, as well as causes not only reduction in durability but also staining of head by the blooming of the lubricant, particularly, at elevated temperatures.

In order to solve these problems, binders superior in the dispersibility of magnetic powders as well as adhesion force to non-magnetic substrates have been proposed (Japanese Patent Application No. 66459/1978 or U.S. Pat. No. 4,152,485). The binders, however, are not satisfactory to obtain magnetic recording media intended by the present invention, i.e. those in which the friction coefficient is low and besides its change is very little over a wide range of temperatures and humidities, and besides which are superior in abrasion resistance and durability as well as surface smoothness. As a result of a further extensive study, the present inventors succeeded in obtaining magnetic recording media sufficiently meeting the above objects. The present invention provides a magnetic recording medium characterized in that a magnetic layer containing (A) a polyurethane resin having a metal sulfonate group of 10 to 1000 equivalents/$10^6$ g of the polymer, (B) one or more members selected from the esters of $C_{10}$–$C_{18}$ fatty acids with butyl cellosolve and (C) ferromagnetic fine particles, the ratio of (B) to (A) being 1 to 20 wt.%, is applied to a non-magnetic substrate.

It suffices for the polyurethane resin used in the present invention to contain a metal sulfonate group of 10 to 1000 equivalents/$10^6$ g of the polymer. When the content of the metal sulfonate group is less than 10 equivalents/$10^6$ g of the polymer, no increase in the Br/Bm ratio can not only be expected, but high-density packing of magnetic particles cannot also be attained. When the content of the metal sulfonate group exceeds 1000 equivalents/$10^6$ g of the polymer, the polyurethane resin becomes poor in solubility in solvents, lacking practical value.

The polyurethane resin of the present invention is obtained by the reaction of a polyhydroxy compound with polyisocyanate, in which case a part or all of the polyhydroxy compound used contains a metal sulfonate group.

A particularly preferred example of the polyhydroxy compound having a metal sulfonate group is a polyester polyol having a metal sulfonate group which comprises a carboxylic acid component having no metal sulfonate group, a glycol component and a dicarboxylic acid component having a metal sulfonate group.

The carboxylic acid component having no metal sulfonate group includes aromatic dicarboxylic acids (e.g. terephthalic acid, isophthalic acid, orthophthalic acid, 1,5-naphthalic acid), aromatic oxycarboxylic acids [e.g. p-oxybenzoic acid, p-(hydroxyethoxy)benzoic acid], aliphatic dicarboxylic acids (e.g. succinic acid, adipic acid, azelaic acid, sebacic acid, dodecanedicarboxylic acid), and tri- or tetracarboxylic acids (e.g. trimellitic acid, trimesic acid, pyromellitic acid).

The glycol component includes ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, ethylene oxide and/or propylene oxide adduct of bisphenol A, ethylene oxide and/or propylene oxide adduct of hydrogenated bisphenol A, polyethylene glycol, polypropylene glycol, polytetramethylene glycol, etc. This glycol component may be used in combination with a tri- or tetraol (e.g. trimethylolethane, trimethylolpropane, glycerin, pentaerythritol).

The dicarboxylic acid component having a metal sulfonate group includes 5-sodium sulfoisophthalic acid, 5-potassium sulfoisophthalic acid, 2-sodium sulfoterephthalic acid, 2-potassium sulfoterephthalic acid, etc. The copolymerization amount of these dicarboxylic acid components having a metal sulfonate group is 0.5 mole% or more, preferably 1 to 50 mole% based on the total carboxylic acid components.

The foregoing polyhydroxy compounds having a metal sulfonate group may be used alone or in combination. These polyhydroxy compounds may be used together with a polyhydroxy compound having no metal sulfonate group, such as the common polyester polyols, polyether polyols or acryl polyols, derivatives of castor oil or tall oil and other hydroxy group-containing compounds.

The polyisocyanate used for the preparation of the polyurethane resin of the present invention includes 2,4-tolylenediisocyanate, 2,6-tolylenediisocyanate, p-phenylenediisocyanate, diphenylmethanediisocyanate, m-phenylenediisocyanate, hexamethylenediisocyanate, tetramethylenedioscyanate, 3,3'-dimethoxy-4,4'-biphenylenediisocyanate, 2,4-naphthalenediisocyanate, 3,3'-dimethyl-4,4'-biphenylenediisocyanate, 4,4'-diphenylenediisocyanate, 4,4'-diisocyanatediphenyl ether, 1,5-naphthalenediisocyanate, p-xylylenediisocyanate, m-xylylenediisocyanate, 1,3-diisocyanatemethylcyclohexane, 1,4-diisocyanatemethylcyclohexane, 4,4'-diisocyanatedicyclohexane, 4,4'-diisocyanatedicyclohexylmethane, isophoronediisocyanate, etc. If necessary, these polyisocyanates may be used together with small amounts of 2,4,4'-triisocyanatediphenyl, benzenetriisocyanate, etc.

The polyurethane resin is obtained by reacting a polyhydroxy compound with polyisocyanate with or without a solvent by the well-known method. Preferred mixing ratio of polyisocyanate to polyhydroxy compound is 0.5–2 to 1 as expressed by the ratio of the NCO group of polyisocyanate to the OH group of polyhydroxy compound. The molecular weight of the polyurethane resin obtained is preferably 8,000 to 100,000.

In the present invention, it was found that when the binder is used together with nitrocellulose, the surface of the coating film (magnetic layer) is given a further more improved smoothness, and besides that remarkable effects to prevent the coating film from a lowering in hardness and a rise in dynamic friction coefficient, particularly, at elevated temperatures are developed. Nitrocellulose used in the present invention is not particularly limited, but those having a nitration degree of 10 to 12% and a polymerization degree of 50 to 200 are preferred, and Celline ® (a product of Daiseru Kagaku Kogyo C.), etc. are given as an example of such nitrocellulose. Too low polymerization degrees make the coating film brittle, and too high ones make the viscosity of paints too high for application, so that the above ranges are not preferred. In the present invention, the mixing ratio of nitrocellulose to the polyurethane resin is generally 3 to 200 parts by weight, preferably 5 to 100 parts by weight, more preferably 5 to 50 parts by weight based on 100 parts by weight of the latter.

The ester of a $C_{10}$–$C_{18}$ fatty acid with butyl cellosolve, which is used in the present invention and acts as a lubricant, includes specifically n-butylcellosolve laurate, n-butylcellosolve myristate, n-butylcellosolve palmitate, n-butylcellosolve stearate, n-butylcellosolve oleate, sec-butylcellosolve laurate, sec-butylcellosolve myristate, sec-butylcellosolve palmitate, sec-butylcellosolve stearate, tert-butylcellosolve laurate, tert-butylcellosolve myristate, tert-butylcellosolve palmitate, tert-butylcellosolve stearate, etc. Of these esters, preferred ones are esters of $C_{10}$–$C_{18}$ saturated fatty acids with n-butylcellosolve, and more preferred ones are n-butylcellosolve palmitate and n-butylcellosolve stearate. These lubricants may be used alone or in mixture of two or more of them. The amount of the lubricant necessary to sufficiently lower the friction coefficient and prevent the head staining by blooming is preferably 1 to 20 wt.%, more preferably 3 to 15 wt.% based on the polyurethane resin. A reason why combination of the lubricant with the metal sulfonate group-containing polyurethane resin of the present invention displays such particularly excellent effects is not clear. But, the followings may be considered: The lubricant and the resin have moderate interaction and compatibility between them, and this makes the generation of blooming difficult even at elevated temperatures, forms a tough oily layer which has strongly been bonded to the coating film surface, and besides has no adverse effect on the adhesion of the resin to the non-magnetic substrate, as a result of which the friction coefficient of the coating film lowers and its change becomes little over wide ranges of from lowered temperature to elevated temperature as well as from lowered humidity to elevated humidity.

In the present invention, it is preferred to add a resin compatible with the polyurethane resin of the present invention or a mixture of the resin and nitrocellulose and/or a compound crosslinkable with the polyurethane resin or a mixture of the resin and nitrocellulose, so far as the dispersibility of magnetic powders is not damaged, and then carry out mixing and/or reaction. Said crosslinkable compound includes epoxy resins, isocyanate compounds, melamine resins, urea resins, etc., among which the isocyanate compounds are particularly preferred. Of the isocyanate compounds, polyisocyanate compounds having two or more isocyanate groups are more preferred. Of the polyisocyanate compounds acting as a crosslinking agent, the cyclic trimer of hexamethylenediisocyanate, specifically Coronate EH (a product of Nippon Polyurethane Co.), is particularly preferably used.

The above crosslinking agent contributes to improvements in abrasion resistance and durability within a wide range of temperatures and humidities, and this was found to result from the followings: The crosslinking agent is flexible in itself and has three isocyanate functional groups so that, when combined with a binder, it forms a flexible net-like structure having a high crosslinking density, and this net-like structure much lowers the temperature dependency of the mechanical properties (e.g. tensibility, elasticity) of the coating film without damaging elastic recovery and flexibility, particularly, at lowered temperatures. The amount of the crosslinking agent is determined taking into account that the coating film should not become brittle and an effective crosslinking density should be obtained, and it is generally 5 to 100 wt.%, preferably 5 to 60 wt.%, more preferably 10 to 40 wt.% based on the binder used in the present invention.

The ferromagnetic fine particles (magnetic powders) used in the present invention include fine particles of $\gamma$-$Fe_2O_3$ having a spinel structure, $CrO_2$, cobalt ferrite ($CoO \cdot Fe_2O_3$), cobalt-adsorbed iron oxide, ferromagnetic Fe-Co-Ni alloy, hexagonal ferrite, etc. Further, in order to elevate the electroconductivity of the magnetic layer of the present invention, fine particles of carbon and/or graphite may be incorporated in the layer. Further, other non-magnetic inorganic fine particles of high hardness (6 or more in Mohs' hardness), for example $Cr_2O_3$, $Al_2O_3$, SiC, $SiO_2$, etc., may be added as an abrasive. Hereupon, the fine particles refer to particles having a particle size of 0.001 to 2.0μ.

The non-magnetic substrate used in the present invention is properly selected from a group consisting of polymers such as polyesters (particularly, polyesters consisting essentially of polyethylene terephthalate), polyphenylene sulfides, etc., and tapes, films and sheet-like products made of materials comprising the above polymers, fibrous, powdery or granular reinforcing agents and fillers.

The present invention will be illustrated specifically with reference to the following examples, but it is not limited to these examples.

EXAMPLES 1 TO 5 AND COMPARATIVE EXAMPLES 1 TO 6

Production of polyester polyol

To a reactor equipped with a thermometer, a stirrer and a partial reflux condenser were added 582 parts of dimethyl terephthalate, 296 parts of dimethyl 5-sodium sulfoisophthalate, 434 parts of ethylene glycol, 728 parts of neopentyl glycol, 0.66 part of zinc acetate and 0.08 part of sodium acetate, and ester-interchange was carried out at a temperature of from 140° to 220° C. for 3 hours. Thereafter, 1,212 parts of sebacic acid was added, and reaction was carried out at a temperature of from 210° to 250° C. for 2 hours. After the reaction, the pressure of the reaction system was reduced to 20 mmHg over 30 minutes, and polycondensation was carried out at a temperature of 250° C. for 50 minutes at 5 to 20 mmHg. The polyester polyol (a) thus obtained had a reduced viscosity ($\eta_{sp}/c$) of 0.182 and a hydroxyl value of 38. NMR analysis showed that the composition of the polyester polyol (a) was as follows: Terephthalic acid, 30 mole%; 5-sodium sulfoisophthalic acid, 10 mole%; sebacic acid, 60 mole%; ethylene glycol, 44 mole%; and neopentyl glycol, 56 mole%. In the same manner as above, the polyester polyol (b) was obtained, and it had a reduced viscosity ($\eta_{sp}/c$) of 0.302 and a hydroxyl value of 22. NMR analysis showed that the composition of the polyester polyol (b) was as follows: Terephthalic acid, 30 mole%; isophthalic acid, 20 mole%; adipic acid, 50 mole%; ethylene glycol, 65 mole%; and 1,5-pentanediol, 35 mole%.

Production of polyurethane resin

To a reactor equipped with a thermometer, a stirrer and a reflux condenser were added 1,280 parts of toluene, 850 parts of methyl isobutyl ketone, 1,000 parts of the polyester polyol (a), 71 parts of diphenylmethanediisocyanate and 1.2 parts of dibutyltin dilaurate, and reaction was carried out at a temperature of from 70° to 90° C. for 8 hours. The polyurethane resin (I) thus obtained had a metal sulfonate group of 378 equivalents/$10^6$ g and a molecular weight of 18,000. In the same manner as above, a polyurethane resin (II) was obtained using 10 parts of the polyester polyol (a) and 990 parts of the polyester polyol (b). This polyurethane resin (II) had a metal sulfonate group of 3.9 equivalents/$10^6$ g and a molecular weight of 30,000.

Production of magnetic recording medium

|  | Parts |
| --- | --- |
| Co-covered $\gamma$-Fe$_2$O$_3$ (a product of Toda Kogyo Co.) | 50 |
| Cr$_2$O$_3$ (a product of Bayer Co.) | 4 |
| Carbon (Ketzen Black ®; a product of Lion Akzo Co., Ltd.) | 2 |
| Polyurethane resin (30%) | 80 |
| Methyl ethyl ketone | 40 |
| Toluene | 40 |
| Cyclohexane | 40 |

After these materials were placed in a ball mill and milled together for 60 hours, 3.6 parts of Coronate L (trimethylolpropane/tolylenediisocyanate adduct; a product of Nippon Polyurethane Co.) and w part of a lubricant (described in Table 1) were added thereto, and the resulting mixture was uniformly mixed with stirring. Each prepared magnetic paint was filtered, defoamed and coated onto a polyethylene terephthalate film of 75μ in thickness by means of a doctor blade (gap, 25μ). After removing the solvent in a hot-air dryer kept at a temperature of about 80° C., coating and drying were similarly applied to the back of the film, and the film was placed in an atmosphere controlling box kept at a temperature of 60° C. and at a relative humidity of 65% to sufficiently harden the magnetic layer. The thickness of the coating film obtained was about 2.5μ. A round plate of 3.5 inch in diameter was cut from the film to prepare a disc. The composition of the magnetic layer and performances of the disc in the examples and comparative examples are shown in Table 1.

TABLE 1

| Composition and performance | Example |  |  |  |  | Comparative example |  |  |  |  |  |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Composition or kind |  |  |  |  |  |  |  |  |  |  |  |
| Polyurethane resin | I | I | I | I | I/II = 5/95 | II | II | II | I | I | I |
| Butylcellosolve stearate, w | 0.25 | 2.5 | 4.5 | 1.75 | 1.75 | 6.0 | 6.0 | 2.5 | 0 | 0 | 0 |
| Butylcellosolve palmitate, w | 0 | 0 | 0 | 0.75 | 0.75 | 0.75 | 0 | 0 | 0 | 0 | 0 |
| N—butyl myristate, w | 0 | 0 | 0 | 0 | 0 | 0 | 0 | 0 | 2.5 | 0 | 0 |
| Dimethylpolysiloxane, w | 0 | 0 | 0 | 0 | 0 | 0 | 0 | 0 | 0 | 2.5 | 0 |
| Liquid paraffin, w | 0 | 0 | 0 | 0 | 0 | 0 | 0 | 0 | 0 | 0 | 2.5 |
| Performance |  |  |  |  |  |  |  |  |  |  |  |
| Roughness of surface (RA, μ) | 0.035 | 0.040 | 0.045 | 0.035 | 0.038 | 0.050 | 0.056 | 0.051 | 0.039 | 0.069 | 0.063 |
| Dynamic friction coefficient, 5° C. | 0.23 | 0.15 | 0.15 | 0.16 | 0.18 | 0.29 | 0.30 | 0.29 | 0.17 | Not measurable |  |
| Dynamic friction coefficient, 45° C. | 0.27 | 0.19 | 0.22 | 0.20 | 0.22 | 0.55 | 0.56 | 0.59 | 0.54 | 0.48 | 0.50 |
| Durability* 1  5° C., 10% RH | 12 | 8 | 5> | 5> | 5> | ** | ** | ** | ** | ** | ** |
| Durability 45° C., 85% RH | 18 | 11 | 15 | 10 | 12 | ** | *** | *** | *** | *** | *** |

**During driving, the coating film was scratched and the drive stopped.
***Rotation torque was so large that the drive stopped.
* 1 The durability was expressed by output reduction (%) at the 3,000,000th passage when a continuous driving test was carried out by a floppy disc drive in an atmosphere controlling box.

The performances were measured by the following methods:

Roughness of surface:
  Measured on "Surfcom" (a product of Tokyo Seimitsu K.K.)

Dynamic friction coefficient:
  Frictional force when a head load of 20 g was applied to a disc which was being rotated at 300 r.p.m. was detected and measured by means of a strain gauge.

Compressive elastic recovery:

Calculated from the stress-strain curve obtained by applying a load to a sample of 5 mmφ on a TMA (thermal mechanical analyzer) until the load reaches 50 g at a rate of 10 g/min, removing the load at the same rate as above, and then measuring strain when the load reaches zero.

Durability:

A continuous driving test was carried out by disc drive in an atmosphere controlling box, and output reduction (%) at the 3,000,000th passage was measured.

EXAMPLES 6 TO 14 AND COMPARATIVE EXAMPLES 7 TO 13

As described below, magnetic recording media were produced using the polyurethane resins obtained in Examples 1 to 5 and Comparative examples 1 to 6 and evaluated.

Production of magnetic recording media

|  | Parts |
|---|---|
| Co-covered γ-Fe$_2$O$_3$ (a product of Toda Kogyo Co.) | 50 |
| Cr$_2$O$_3$ (a product of Bayer Co.) | 4 |
| Carbon (Ketzen Black ®; a product of Lion Akzo Co., Ltd.) | 2 |
| Polyurethane resin (30%) | x (described in Table 2) |
| Nitrocellulose (16%) (Celline ®, a product of Daiseru Co.) | y (described in Table 2) |
| Methyl ethyl ketone | 40 |
| Toluene | 40 |
| Cyclohexanone | 40 |

After these materials were placed in a ball mill and milled together for 60 hours, z parts (described in Table 2) of Coronate EH (a product of Nippon Polyurethane Co.) and w parts (described in Table 2) of a lubricant were added thereto, and the resulting mixture was uniformly mixed with stirring. Each prepared magnetic paint was filtered, defoamed and coated onto a polyethylene terephthalate film of 75μ in thickness by means of a doctor blade (gap, 25μ). After removing the solvent in a hot-air dryer kept at a temperature of about 80° C., coating and drying were similarly applied to the back of the film, and the film was placed in an atmosphere controlling box kept at a temperature of 60° C. and at a relative humidity of 65% to sufficiently harden the magnetic layer. The thickness of the coating film obtained was about 2.5μ. A round plate of 3.5 inch in diameter was cut from the film to prepare a disc. The composition of the magnetic layer and the performances of the disc in the examples and comparative examples are shown in Table 2.

TABLE 2

| Composition (part) and performance | | Example and comparative example numbers Example | | | | | | | | |
|---|---|---|---|---|---|---|---|---|---|---|
| | | 6 | 7 | 8 | 9 | 10 | 11 | 12 | 13 | 14 |
| Polyurethane resin (I), x | | 72 | 64 | 72 | 72 | 72 | 72 | 3.5 | 50 | 50 |
| Polyurethane resin (II), x | | 0 | 0 | 0 | 0 | 0 | 0 | 68.5 | 22 | 22 |
| Nitrocellulose, y | | 15 | 30 | 15 | 15 | 15 | 15 | 15 | 15 | 15 |
| Butylcellosolve palmitate, w | | 1.75 | 1.75 | 0.9 | 1.25 | 1.75 | 1.75 | 1.75 | 2.5 | 0 |
| Butylcellosolve stearate, w | | 0.75 | 0.75 | 0.4 | 1.25 | 0.75 | 0.75 | 0.75 | 0 | 2.5 |
| n-Butyl myristate | | 0 | 0 | 0 | 0 | 0 | 0 | 0 | 0 | 0 |
| Dimethyl polysiloxane | | 0 | 0 | 0 | 0 | 0 | 0 | 0 | 0 | 0 |
| Liquid paraffin | | 0 | 0 | 0 | 0 | 0 | 0 | 0 | 0 | 0 |
| Coronate EH, z | | 5.0 | 5.0 | 5.0 | 5.0 | 2.5 | 10.0 | 5.0 | 6.5 | 6.5 |
| Roughness of surface (RA, μ) | | 0.040 | 0.036 | 0.038 | 0.040 | 0.035 | 0.037 | 0.041 | 0.039 | 0.038 |
| Dynamic friction coefficient (μD) | 5° C. | 0.17 | 0.15 | 0.22 | 0.17 | 0.23 | 0.18 | 0.21 | 0.21 | 0.24 |
| | 45° C. | 0.21 | 0.18 | 0.27 | 0.23 | 0.29 | 0.20 | 0.23 | 0.24 | 0.25 |
| Compressive elastic recovery (%) | 5° C. | 93 | 97 | 95 | 93 | 89 | 95 | 90 | 92 | 90 |
| | 45° C. | 88 | 93 | 91 | 89 | 83 | 92 | 88 | 91 | 89 |
| Durability (%) | 5° C., 10% RH | 5> | 5> | 5> | 5> | 8> | 5> | 5> | 5> | 5> |
| | 45° C., 80% RH | 5> | 5> | 10 | 5> | 12 | 5> | 5> | 5> | 7 |

| Composition (part) and performance | | Example and comparative example numbers Comparative example | | | | | | |
|---|---|---|---|---|---|---|---|---|
| | | 7 | 8 | 9 | 10 | 11 | 12 | 13 |
| Polyurethane resin (I), x | | 0 | 72 | 72 | 72 | 72 | 3.5 | 72 |
| Polyurethane resin (II), x | | 72 | 0 | 0 | 0 | 0 | 68.5 | 0 |
| Nitrocellulose, y | | 15 | 15 | 15 | 15 | 15 | 15 | 0 |
| Butylcellosolve palmitate, w | | 1.75 | 0 | 0 | 0 | 0 | 0 | 0 |
| Butylcellosolve stearate, w | | 0.75 | 0 | 0 | 0 | 0 | 0 | 0 |
| n-Butyl myristate | | 0 | 2.5 | 2.5 | 0 | 0 | 2.5 | 0 |
| Dimethyl polysiloxane | | 0 | 0 | 0 | 2.5 | 0 | 0 | 0.75 |
| Liquid paraffin | | 0 | 0 | 0 | 0 | 2.5 | 0 | 1.75 |
| Coronate EH, z | | 5.0 | 2.5 | 5.0 | 5.0 | 5.0 | 5.0 | 5.0 |
| Roughness of surface (RA, μ) | | 0.058 | 0.035 | 0.039 | 0.067 | 0.061 | 0.060 | 0.040 |
| Dynamic friction coefficient (μD) | 5° C. | 0.35 | 0.18 | 0.21 | * | * | * | 0.30 |
| | 45° C. | 0.47 | 0.55 | 0.49 | 0.43 | 0.46 | 0.53 | 0.65 |
| Compressive elastic recovery (%) | 5° C. | 85 | 88 | 91 | 81 | 83 | 88 | 75 |
| | 45° C. | 80 | 42 | 82 | 73 | 77 | 80 | 40 |
| Durability | 5° C., 10% RH | ** | 5> | ** | ** | ** | ** | ** |

TABLE 2-continued

| (%) | 45° C., 80% RH | *** | *** | *** | *** | *** | *** | *** |
|---|---|---|---|---|---|---|---|---|

*: Not measurable
**: During driving, the coating film was scratched and the drive stopped.
***: Rotation torque was so large that the drive stopped.

What is claimed is:

1. A magnetic recording medium characterized in that a magnetic layer containing (A) a polyurethane resin having a metal sulfonate group of 10 to 1000 equivalents/$10^6$ g of the polymer, (B) one or more members selected from the esters of $C_{10}$–$C_{18}$ fatty acids with butyl cellosolve and (C) ferromagnetic fine particles, the ratio of (B) to (A) being 1 to 20 wt.%, is applied to a non-magnetic substrate.

2. A magnetic recording medium as claimed in claim 1, wherein the magnetic layer contains the cyclic trimer of hexamethylenediisocyanate of 5 to 100 wt.% based on (A).

3. A magnetic recording medium as claimed in claim 1, wherein (B) is n-butylcellosolve palmitate or n-butylcellosolve stearate.

4. A magnetic recording medium as claimed in claim 1, wherein the magnetic layer contains nitrocellulose of 3 to 200 wt.% based on (A).

5. A magnetic recording medium as claimed in claim 1, wherein the magnetic layer contains fine particles of carbon and/or graphite of 3 to 16 wt.% based on (A).

6. A magnetic recording medium as claimed in claim 1, wherein the magentic layer contains fine particles of a non-magnetic substrate having a Mohs' hardness of 6 or more of 5 to 30 wt.% based on (A).

7. A magnetic recording medium as claimed in claim 1 which is a flexible and disc-like magnetic recording medium.

* * * * *